United States Patent [19]

Giesche et al.

[11] Patent Number: 4,626,903

[45] Date of Patent: Dec. 2, 1986

[54] METHOD FOR POINT-BY-POINT AND LINE-BY-LINE EXPOSING OF COLOR IMAGES USING TWO CORRECTION STAGES

[75] Inventors: Ernst Giesche, Lilienthal; Eggert Jung, Schoenberg; Helma Meintz, Schoenkirchen; Christian Roes, Kiel, all of Fed. Rep. of Germany

[73] Assignee: Dr. Ing. Rudolf Hell GmbH, Fed. Rep. of Germany

[21] Appl. No.: 597,110

[22] Filed: Apr. 5, 1984

[30] Foreign Application Priority Data

Apr. 27, 1983 [EP] European Pat. Off. .......... 83104101

[51] Int. Cl.[4] .......................... G03F 3/08; H04N 1/46
[52] U.S. Cl. .......................................... 358/80; 358/75
[58] Field of Search .................. 358/75, 76, 77, 78, 358/80

[56] References Cited

U.S. PATENT DOCUMENTS

| | | |
|---|---|---|
| 2,757,571 | 8/1956 | Loughren .............. 358/76 |
| 2,993,087 | 7/1961 | Hell .................... 358/80 |
| 3,272,918 | 9/1966 | Koll et al. ............ 358/280 |
| 4,037,249 | 7/1977 | Pugsley ................ 358/80 |
| 4,075,662 | 2/1978 | Gall .................... 358/80 |
| 4,285,009 | 8/1981 | Klopsch ................ 358/80 |
| 4,561,016 | 12/1985 | Jung et al. ............ 358/80 |

FOREIGN PATENT DOCUMENTS 13505 1/1980 Japan ..................... 358/75
1541554 3/1979 United Kingdom .

*Primary Examiner*—James J. Groody
*Assistant Examiner*—Randall S. Svihla
*Attorney, Agent, or Firm*—Hill, Van Santen, Steadman & Simpson

[57] ABSTRACT

Apparatus and method for producing qualitatively high-grade color images of originals such as copy masters for multi-color or process printing by exposing chromatic material wherein the originals are scanned point-by-point and line-by-line and the color signals thus obtained are converted into color density values for the chromatic material by means of a correction of color and of gradation. The drive values for a color exposure unit which exposes the chromatic material point-wise and line-wise are generated from the color density values using a linearization process. As a result of signal inversion color positive originals can be recorded as color negatives and vice versa. The exposure process can be matched to every chromatic material independently of the nature of the original to be reproduced and the state of the developing process by means of changing the color density values according to an arbitrarily selectable correction function and by means of signal inversion.

16 Claims, 1 Drawing Figure

METHOD FOR POINT-BY-POINT AND LINE-BY-LINE EXPOSING OF COLOR IMAGES USING TWO CORRECTION STAGES

BACKGROUND OF THE INVENTION

1. Field of the Invention

This invention relates in general to electronic reproduction technology and in particular to methods and apparatus for producing color images particularly from copy masters for multi-color printing.

2. Description of the Prior Art

In the reproduction technology for multi-color or process printing, copy masters are made from original masters before the production of the color separations. The copy masters are color corrected relative to the original masters and are adapted in density range, in other words, are standardized in terms of density and enlarged to the final format under given conditions. The copy masters can be opaque copy masters which chromatically correspond to the printed product which is to be later produced in the highest possible degree and are employed as print-committing copy masters which, for example, are examined by the client so that he can evaluate them and give final authorization for printing or they may be employed as proofs for the quality control in multi-color or process printing. The copy masters can also be transparency copy masters such as, for example, duplicate transparencies produced from original transparencies which also can be utilized for a reproduction supervision. The color images to be produced can also, however, be a matter of simple color copies of color picture originals that are prepared by businesses for developing or reproducing.

Previously copying devices have been employed for the production of such color copies and reproduction cameras have been utilized for the production of high quality copying masters and the original masters being respectively transferred as a whole to the color material For the purpose of simple color correction in the case of color copies, color filters are introduced into the exposure path so as for example to compensate the overall color cast of an original master. Contrast and color correction masks must be produced and interposed into the exposure path so as to achieve a higher quality color correction in the case of copy masters Enlargement cameras are also employed so as to bring the original masters to the final format. Complicated intermediate processes have been required for producing copy masters in the prior art.

The prior art methods for producing color images have the disadvantage that due to the additional production of correction masks and intermediate negatives, the methods are complicated and time consuming and expensive and do not enable optimum color correction. Also, a loss of sharpness can occur when a specific copy master is enlarged relative to the original master.

SUMMARY OF THE INVENTION

The present invention relates to method and apparatus for eliminating the disadvantages of the prior art and for producing color images which allow high quality color images such as copy masters to be produced from color masters. In the method of the invention, color values, r, g, b obtained by point-to-point and line-by-line master scanning are converted by means of a color and/or gradation correction into desired color density values $D'_Y$, $D'_M$, $D'_C$ which identify the colors to be exposed on the chromatic material. The desired color density values $D'_Y$, $D'_M$ and $D'_C$ are recalculated and converted into actual color density values by considering a color density linearization for the chromatic material that is utilized before the production of the color images. The actual color density values are converted into drive signals r, g, b for a color exposure unit which generates a chromatic light whereby the drive values r, g, b define the luminous energies of the chromatic light and, thus, the color densities obtained on the chromatic material. The chromatic light is used to expose the chromatic material point-by-point and line-by-line.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
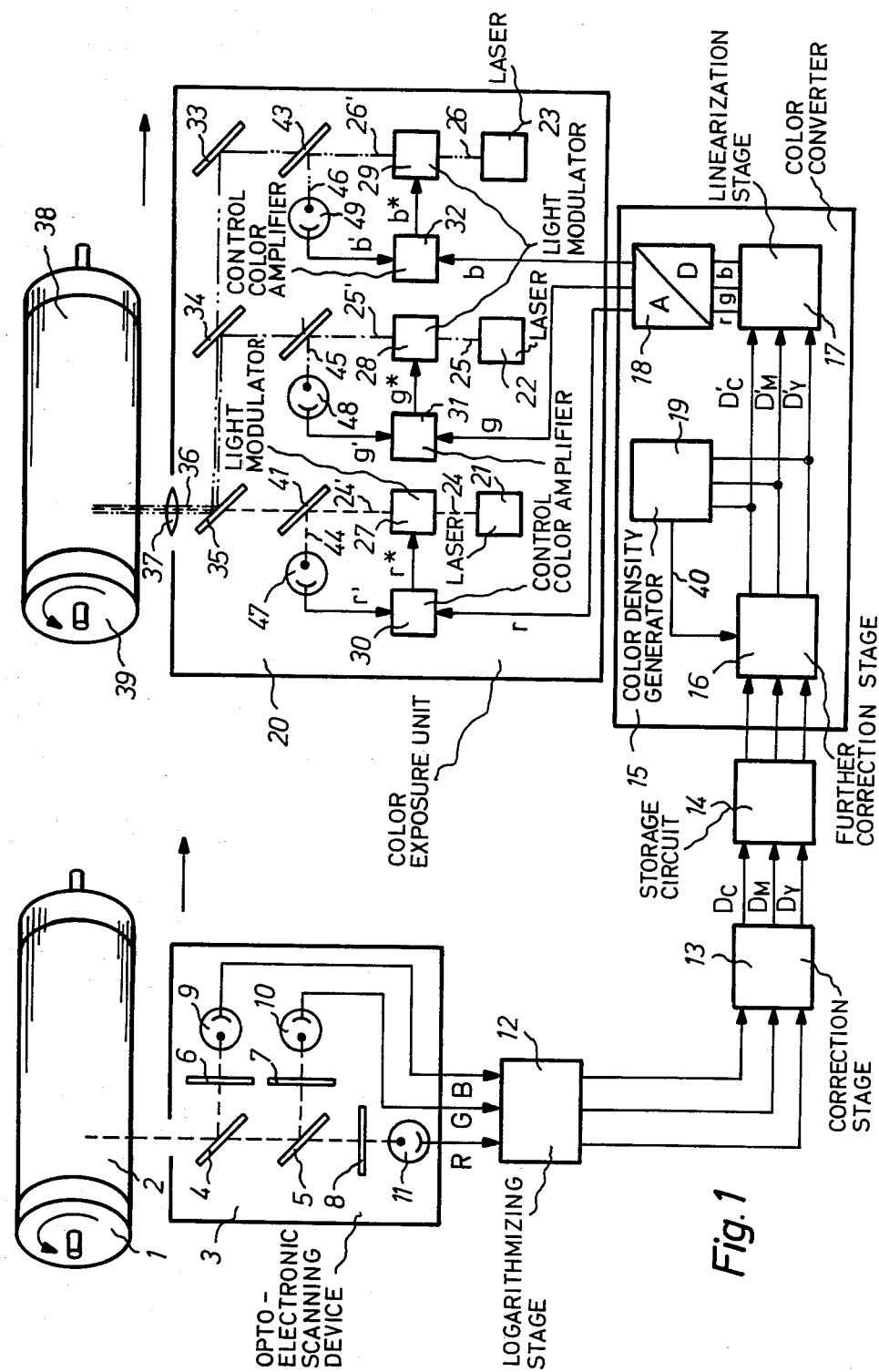
FIG. 1 is a block diagram illustrating in detail the method and apparatus of the invention.

The FIG. 1 illustrates an exemplary best mode embodiment of a color image reproduction means which has an exposure unit for color materials.

A color master 2 is mounted on a rotating scanner drum 1 of a reproducing means which is not shown in detail and is well known to those skilled in the art. Color master 2 can be an original color master from which a corrected color image is to be produced or can be an already reproduced color image from which a copy is merely to be made. The color master 2 can be in the form of an opaque or transparency master as well as in the form of a color positive or a color negative.

An opto-electronic scanning device 3 which moves axially along the scanner drum 1 scans the color master 2 point-by-point and line-by-line. The scanning light obtained from the color master is split into three color components by means of two dichroic color splitters 4 and 5 and three color filters 6, 7 and 8 and is converted into color value signals in opto-electronic transducers 9, 10 and 11. In the exemplary embodiment, the color values are the primary measured value color signals R, G and B, also referred to as filter values, which represent the color components "red", "green", and "blue" of the scanned color points. The color value signals, however, can also be obtained as spectral values. For this case, the scanning element 3 would consist of a spectral-measuring means. The sharpness or, respectively, the contrast corrections can be additionally accomplished at the scanned color master in the scanning element 3 with prior art known means of electronic unsharp masking which is impossible using prior art reproduction cameras for color image reproduction.

The measured color values R, G and B obtained by the scanning element 3 are logarithmized in a logarithmizing stage 12 and are corrected to color density values $D_Y$, $D_M$ and $D_C$ according to equation (1) in a correction stage 13 which follows the logarithmizing stage 12 according to a freely selectable correction function $f_1$ by considering the regularities of subtractive color mixing.

$$D_Y, D_M, D_C = f_1(R, G, B) \qquad (1)$$

Alternatively, the measured color values R, G and B can also be converted into color separation value signals (Y, M, C) representing yellow, magenta and cyan or can be converted into spectral values (X, Y, Z) in the correction stage 13. The color values obtained in the color correction stage 13 can be displayed on a monitor or in another expedient manner so as to facilitate monitoring by the operator.

The correction stage 13 can be designed as an analog signal processing circuit such as described in U.S. Pat. No. 4,285,009 which is hereby incorporated by reference. Alternatively, the correction stage 13 can comprise a digital signal processing stage with a memory, for example, an allocation memory such as described in U.S. Pat. No. 2,993,087 which is hereby incorporated by reference and in which a corresponding color density value triad is allocated to every theoretical possible measured color value triad. Alternatively, a supporting value memory having a lower memory capacity than that of the allocation memory and an interpolation stage as described in British Pat. No. 1,541,554 can be utilized. For this case, all of the allocations of measured color value triads and color density value triads required for the color image exposure are determined by means of an interpolation calculation for the supporting values which are stored in the supporting value memory.

When a color correction computer for four color printing is employed as the correction stage 13, corresponding black values are calculated for the color separation values for the color separation "black" and are combined with the color separation values (Y, M, C) to obtain the color separations "yellow", "magenta" and "cyan".

The storage circuit or means 14 receives the output of the correction stage 13 and stores the color value signals. In case, for example, the color images are to be recorded with a reproduction scale that is changed relative to the original master, the storage circuit 14 can be a circuit for electronic alteration of the reproduction scale such as described in U.S. Pat. No. 3,272,918 which is incorporated by reference herein and wherein the digitized color values are written into a line memory or a vertical format buffer with a write clock and/or in turn read out therefrom with a read clock and further processed whereby the frequency ratio of the write and read clocks define the desired reproduction scale. The disadvantages of the traditional reproduction camera such as light scatter, image distortion and so forth can be avoided in an advantageous manner in the color image reproduction means with the assistance of electronic scale alteration.

The storage circuit 14 can also be a whole image or a frame memory in which all color values of a master or of a page assembled from individual masters are stored.

The storage circuit 14 supplies an output to a color converter 15 which consists as shown in the Figure of a further correction stage 16 which supplies an output to a linearization stage 17 which supplies an output to a digital to analog converter 18. A color density generator 19 supplies inputs to the further correction stage 16 through line 40 and to the linearization stage 17.

Analog drive signals r, g and b for a color exposure unit 20 are produced in the color converter circuit 15 from the color density values $D_Y$, $D_M$ and $D_C$ which are read out of the storage circuit 14. The detailed construction and operation of the color converter 15 will be explained in detail hereafter.

In an exemplary embodiment, the color exposure unit 20 comprises three lasers 21, 22 and 23 which generate mono-chromatic laser light in the red, green and blue regions of the spectrum. The laser 21 for example may be a HeNe laser which has a wave length output of 633 nm (red). The lasers 22 and 23 may be, for example, Ar lasers which have wave lengths of 514 nm (green) and 476 nm (blue), respectively.

For an alternative structure, a multi-line laser which generates narrow band laser light from all three regions of the spectrum could be utilized. The red, blue and green laser beams 24, 25 and 26 are selectively modulated in intensity in light modulators 27, 28 and 29 as a function of the drive signal values r*, g* and b*. The light modulators are, for example, acousto-optical modulators (AOM). The drive values r*, g*, and b* are obtained in control amplifiers 30, 31 and 32 and are derived from the drive value signals r, g and b produced in the color converter 15.

The intensity-modulated laser beams 24', 25' and 26' are combined to form a recording beam 36. The combination of the beams 24', 25' and 26' is accomplished with the mirror 33 and the two dichroic color splitters 34 and 35 which receive the outputs of the color modulators 27, 28 and 29. The recording beam 36 is focused with a lens system 37 onto a chromatic material 38 which is mounted on a rotating recording drum 39 of the color image reproduction means.

The recording beam 36 exposes the chromatic material 38 point-by-point and line-by-line because the color exposure unit 20 is moved axially along the recording drum 39 and one of the three color layers of the chromatic material 38 responds to each of the individual laser beams. The exposed and developed chromatic material 38 comprises the desired color image or, respectively, the desired copy master.

A xenon lamp can, for example, also be employed as the light source in the color exposure unit 20. The light of the xenon lamp is then divided by color filters into red, green and blue light beams which have their intensities modulated by the drive values r, g and b.

Also, of course, the color image reproduction means can be designed as a flat bed apparatus.

The individual functions and construction of the color converter 15 will now be described in greater detail.

Correction of Color and/or Tonal Values

In the correction stage 16 of the color converter 15, the color density values $D_Y$, $D_M$ and $D_C$ are converted into desired color density values $D'_Y$, $D'_M$ and $D'_C$ by means of a further correction of the color and/or tonal values according to a correction function "$f_2$" according to equation (2)

$$(D'_Y, D'_M, D'_C) = f_2(D_Y, D_M, D_C)$$

Each triad of the desired color density values $D'_Y$, $D'_M$ and $D'_C$ specify those color densities or, respectively, the dye concentrations which must be achieved in the individual color or dye layers of the chromatic material 38 which is to be exposed in order to generate a specific film color.

As previously mentioned, the correction stage 13 may produce output color separation signal values (Y, M and C), or spectral value signals (X, Y and Z) instead of color density value signals $D_Y$, $D_M$ and $D_C$ and these are simultaneously converted into the desired color density values $D'_Y$, $D'_M$ and $D'_C$ in the correction stage 16.

The correction stage 16 may be constructed in an expedient manner as a digital processing circuit with memory. It is, of course, possible to combine the two correction stages 13 and 16 into a single unit. For this case, the measured color value signals R, G and B are immediately converted into the corresponding desired color density values $D'_Y$, $D'_M$ and $D'_C$.

In contrast to the traditional color image reproduction camera, optimum corrections at the master to be reproduced can be achieved with the color image reproduction means due to the leeway in the selectability of the correction functions ($f_1$) and ($f_2$). In an expedient manner, a standard correction function ($f_1$) is input into the correction stage 13 and an individual, fine correction or after correction matched to the master to be produced particularly a partial correction is accomplished by setting the correction function ($f_2$) into the correction stage 16 of the color converter 15.

It is advantageous to achieve the correction parameters which are optimum for the exposure of a color image of an original master and to reload them into the corresponding correction stages of the color image reproduction means for those instances when a color image is again to be made from this original master.

It is also expedient to expose characteristic color fields, so-called calibration fields, on the chromatic material or respectively at the margins of the color image before or after the actual color image exposure. The correction parameters required for an after correction is done with the assistance of these color fields in, for example, the correction stage 16 as supporting values of an interpolation calculation in case an isochromatic copy of a previously reproduced image is to be made at a later time. For the exposure of such color fields, the color density generator 19 of the color converter 15 calls up a triad of color density values $D'_Y$, $D'_M$ and $D'_{C\,for}$ each color field which is to be exposed and the triad is forwarded to the color exposure unit 20 and defines the color of the color field. For a later production of the color image copy, the color image provided with the color fields is again mounted on the scanning drum of the color image reproduction means. The scanning element 3 first scans only the color fields and generates a triad of measured color values R, G and B or respectively, a triad of color density values $D_Y$, $D_M$ and $D_C$ at the input of the correction stage 16 for each scanned color field. Synchronously with the scanning of the color fields, the triads of color density values $D'_Y$, $D'_M$ and $D'_C$ utilized for the exposure of the color fields are again output from the color density generator 19 and are transferred to the correction stage 16 through a bus 40. In the correction stage 16, the triads of color density values $D_Y$, $D_M$ and $D_C$ acquired by the scanning of the color fields and the triads of color density values $D'_Y$, $D'_M$ and $D'_C$ used for the exposure of the color fields are then allocated to one another in pairs for the individual color fields and stored and the reproduction of an isochromatic of a color image is therefore assured. A partial correction can also be accomplished in an advantageous manner by means of a region-wise alteration of the allocation of color density values.

A fast and reproducible setting of the correction parameters is achieved in this manner whereby the errors caused by color sensitization and development as well as scattering of the scanning light source and of the optical properties of the filters are simultaneously compensated.

Linearization Process

The desired color density values $D'_Y$, $D'_M$ and $D'_C$ are to be converted into the drive signal values r, g and b for the chromatic laser beams of the color exposure unit 20 by means of the linearization process such that the dye concentrations are, respectively, the colors corresponding to the desired color density values in fact occur on the chromatic material 38. The drive signal values r, g and b define the light intensities of the red, green, and the blue laser beams 24', 25' and 26' and, thus, define the luminous energies that impinge into the dye layers of the film material. The luminous energies in turn ultimately define the dye concentration or, respectively, the actual color densities in the dye layers of the exposed chromatic materials.

The relationship between the drive signal values r, g and b and the luminous energies is non-linear. The relationship between the luminous energies and the color densities achieved on the chromatic material is likewise non-linear due to the color gradations of the chromatic material.

A linear relationship between the drive signal values r, g and b and the luminous energies is achieved in the color exposure unit 20 by means of a light regulation of the laser beams 24', 25' and 26'.

For the purpose of actual value detection of the beam intensities, sub-beams 44, 45 and 46 are produced by mirrors 41, 42 and 43, respectively, which are semi-reflecting mirrors and the intensities of the sub-beams are measured as actual values r', g' and b' by the photodiodes 47, 48 and 49, respectively. The drive values r, g and b generated in the color converter 15 form the desired values for the light regulation. The drive values r*, g* and b* for the light modulators 27, 28 and 29 are generated by comparing actual values and the desired values in the control amplifiers 30, 31 and 32.

The compensation of the non-linearity caused by the gamma values or, respectively, by the color gradation of the chromatic material utilized occurs in the linearization stage 17 of the color converter 15 in that the linearization function "$f_3$" is determined according to equation (3).

$$r, g, b = f_3(D'_Y, D'_M, D'_C)$$

For the purpose of color density linearization, a color wedge in the form of stepped actual color density values is first exposed on the chromatic material for each color layer of the chromatic material and measured in terms of density. In the exemplary embodiment, the color density generator 19 of the color converter 15 likewise generates stepped desired color density values $D'_Y$, $D'_M$ and $D'_C$ in chronological sequence and these are converted in the linearization stage 17 into corresponding drive signal values r, g and b for the exposure of the color wedges whereby the linearization stage 17 first functions linearly. These drive signal values r, g and b with which the appertaining actual density values were achieved on the chromatic material 38 are then respectively functionally allocated to the measured actual color density values of the color wedges. The inverse function represents the color gradation curve of the chromatic material 38 from which the corrected drive values r, g and b required for the linearization relationship are identified and allocated to the desired color density values $D'_Y$, $D'_M$ and $D'_C$ in the linearization stage 17.

The linearization stage 17 can, for example, contain a loadable memory (RAM) in which the corrected drive signal values r, g and b determined from the linearization process are stored and from which they can be called up by the allocated desired color density values $D'_Y$, $D'_M$ and $D'_C$ during the color image exposure.

Thus, there is achieved by means of the light regulation on the one hand and the color density linearization on the other hand that the desired color densities and the actual color densities coincide on the chromatic material.

Consideration of the Type of Chromatic Material

With the assistance of the color converter 15 the color image can be optionally exposed on opaque or on transparency chromatic material in an advantageous manner independently of the type of scanned master. Any type of color film for example positive films, negative films or reversible films or photographic papers can be employed as the chromatic material 38. Independently of whether it is a color positive or a color negative film, a standard color film consists of a cyan dye layer sensitized for the red region of the spectrum, a magenta layer sensitized for the green region of the spectrum and a yellow dye layer sensitized for the blue region of the spectrum. The red, green and blue laser beams generated in the color exposure unit 20 thus selectively influence the sensitized dye layers and determine the formation or non-formation of the dye concentrations in the dye layers which are responsible for the creation of the colors of the film.

An allocation of the desired color density values ($D'_Y$, $D'_M$, $D'_C$) and the drive signal values (r, g and b) for the chromatic laser beams used for the standard film sensitization is therefore simultaneously produced in the linearization stage 17 according to equation (4).

$$r = f_{3r}(D'_C)$$

$$g = f_{3g}(D'_M)$$

$$b = f_{3b}(D'_Y) \quad (4)$$

Other allocations can, of course, also be utilized in the linearization stage 17.

Reversal of the Reproduction Process

Color positives can be recorded as color negatives or vice versa using the color converter 15.

With a given negative chromatic material, the dye concentration in the appertaining dye layer is increased by means of exposing a dye layer with increasing luminous intensity, but this is suppressed, or in other words, is ineffective due to non-exposure of a dye layer. When a positive chromatic material is used, the dye concentration decreases with the intensity of the exposure so that a dye layer is suppressed by means of exposure with full luminous intensity. A reproduction reversal in the color image exposure can therefore be executed in an advantageous manner by means of an inversion of the drive signal values r, g and b in the linearization stage 17.

The exposure process can thus be matched to every chromatic material in an advantageous manner independently of the type of master to be reproduced and the state of the developing process by means of the change of the color density values according to an arbitrarily selectable correction function in the correction stage 16 and by means of a likewise adjustable signal inversion in the linearization stage 17.

In FIG. 1, the color image reproduction apparatus is shown as a structural unit comprising a scanning device and an exposure device. Of course, such a color image reproduction apparatus can also consist of functionally separate color scanner and a functionally separate color recorder.

Color scanners and color recorders can then work in on line operation as shown in the FIG. 1 or can work in off-line operation whereby the storage circuit 14 is the interface between the color scanner and the color recorder. When a color image combination or color image montage is to be recorded, the recording data required therefore will be acquired in an on-line operation by means of scanning a whole page master assembled according to a layout plan or by means of scanning individual masters under the control of a layout plan and the recording data are intermediately stored in the storage circuit 14. When off-line operation is utilized, the recording data would, for example, be acquired by means of an electronic page makeup according to a layout plan in an image processing system which could be constructed according to that described in British Pat. No. 1,407,487 for example.

Although the invention has been described with respect to preferred embodiments, it is not to be so limited as changes and modifications may be made therein which are within the full intended scope as defined by the appended claims.

We claim as out invention:

1. A method for exposing a color image corresponding to a color original on chromatic photosensitive material point-by-point and line-by-line with a chromatic light recording beam, said chromatic photosensitive material comprising three dye layers sensitized for three different spectral ranges of the chromatic light beam, comprising the steps of:

(a) calculating prior to exposure triplets of nominal color density values $D'_Y$, $D'_M$, $D'_C$) from corresponding triplets of color signals values (R, G, B) by means of correction parameters set for a color and/or tone correction, said corresponding triplets of color signal values (R, G, B) representing original colors of said color original and said calculated triplets of nominal color density values ($D'_Y D'_M$, $D'_C$) representing corresponding exposed colors on said chromatic photosensitive material obtained by subtractive color mixture of the dyes, (b) storing said calculated triplets of nominal color density values ($D'_Y$, $D'_M$, $D'_C$) in a storage medium addressable by the corresponding triplets of color signals values (R, G, B) from which they are calculated, (c) generating three individual light beams having different spectral ranges which correspond to the spectral sensitivities of the dye layers of said chromatic photosensitive material, (d) respectively modulating the light intensities of the three light beams with modulating signal values (r, g, b), (e) compensating for a non-linear relationship between the light intensities of the light beams and the modulating signal values (r, g, b) by regulating the intensities of the individual light beams, (f) combining said modulated and regulated light beams into said recording beam and focusing said recording beam onto said chromatic photosensitive material, (g) linearizing the gradation characteristic of each dye layer of said chromatic photosensitve material individually by means of a test exposure by determining for each nominal color density value a coresponding modulating signal value which is, based on the gradation characteristic of each dye layer, in fact necessary to obtain a desired dye density, (h) allocating triplets of the determined modulating signal values (r, g, b) to corresponding triplets of the nominal color density values ($D'_Y$, $D'_M$, $D'_C$), (i) scanning said color original point-by-point and line-by-line to generate triplets of color signal values (R, G, B) representing the colors of said color original, (j) addressing during exposure the storage medium with said triplets of color signal values (R, G, B) generated from (step b) scanning said color original to call up said corresponding triplets of nominal color density values ($D'_Y$, $D'_M$, $D'_C$) from said storage medium, (k) inverting or not inverting the amplitudes of said called-up triplets of nominal color density values ($D'_Y$, $D'_M$, $D'_C$) depending on whether the chromatic photosensitive material actually being used for exposure is of the negative or positive type, respectively, and (l) transforming said inverted or not inverted triplets of nominal color density values ($D'_Y$, $D'_M$, $D'_C$) into said allocated (step h) triplets of modulating signal values (r,g, b) to modulate of said light beams during exposure of the color image on said chromatic photosensitive material.

2. A method according to claim 1, where in first correction parameters (step a) are used for a standard correction required for the exposure of a color image chromatically equivalent to said color original and wherein second correction parameters are used for an additional fine and/or partial correction required for the exposure of a color image chromatically corrected with respect to said color original.

3. A method according to claim 1, wherein the calculation and storing of said nominal color density values ($D'_Y$, $D'_M$, $D'_C$) is performed prior to exposure of the color image for all theoretically possible original colors.

4. A method according to claim 1, wherein the calculation and storing of said nominal color density values ($D'_Y$, $D'_M$, $D'_C$) is performed prior to exposure of the color image only for a portion of all of the theoretically possible original colors and wherein the nominal color density values required for the exposure of said color image are calculated during the exposure of the color image from said stored nominal color density values by interpolation using said stored nominal color density values as an anchor point grid.

5. A method according to claim 1, wherein the correction parameters set for the exposure of the color image corresponding to a color original are stored and called up again for the exposure of further color images corresponding to said color original.

6. A method according to claim 1, further comprising the steps of:

(a) generating triplets of characteristic nominal color density values ($D'_Y$, $D'_M$, $D'_C$) and transforming said triplets into corresponding modulating signal values (r, g, b), (b) exposing the colors represented by said generated characteristic nominal color density values as color fields on chromatic photosensitive material provided for the subsequent exposure of a color image, (c) when an exposure of said color image is to be repeated, scanning said color fields optoelectronically to obtain a triplet of color signal values (R, G, B) for each color field, and (d) allocating the triplets of the color signal values (R, G, B) for each color field to corresponding triplets of the color density values ($D'_Y$, $D'_M$, $D'_C$) and storing said triplets of color density values in said storage medium addressable by said allocated triplets of color signal values.

7. A method according to claim 1, wherein the step of linearizing the gradation characteristic of each dye layer (step g) is further defined by:

(a) generating desired gradated nominal color density values for each dye layer of said chromatic photosensitive material, said gradated nominal color density values representing color density wedges, and converting said gradated nominal color density values into corresponding gradated modulating signal values (r, g, b), (b) exposing said color density wedges onto chromatic photosensitive material provided for the subsequent exposure of the color image, and (c) measuring the actual color density values of the exposed color density wedges, and allocating the measured actual color density values for the color density wedges and the corresponding gradated modulating signal values to one another in a manner such that the desired gradated color density values are achieved on the chromatic photosensitive material by using the actual color density values instead of the desired gradated color density values.

8. Apparatus for exposing a color image corresponding to a color original on chromatic photosensitive material point-by-point and line-by-line with a chromatic light recording beam, comprising:

(a) an optoelectronic scanning device (3) for obtaining color signal values (R, G, B) by point-by-point and line-by-line scanning of said color original, (b) a correction device (13,16) connected to said scanning device (3) for calculating nominal color density values ($D'_Y$, $D'_M$, $D'_C$) from color signal values (R, G, B) by color and/or tone correction, (c) a linearization stage (17) connected to the correction device (13,16) for converting the nominal color density values into modulating signal values (r, g, b) in such a manner so as to linearize the gradation characteristics of said chromatic photosensitive material, and (d) an exposure unit (20) connected to said linearization stage (17) comprising:

($d_1$) at least one light source (21, 22, 23) for generating individual chromatic light beams having different spectral components, ($d_2$) light modulators (27, 28, 29) which are mounted in the light paths of said light beams for modulating the light intensities of the individual light beams with said modulating signal values (r, g, b), and ($d_3$) optical means (33, 34, 35, 37) for combining said modulated light beams into said recording beam and for focusing said recording beam onto said chromatic photosensitive material.

9. Apparatus according to claim 8, wherein said correction device consists of a first correction stage (13) for calculating color density values ($D_Y, D_M, D_C$) from the color signal values (R, G, B) based on a standard correction of said color original and a second correction stage (16) connected to said first correction stage (13) for converting the color density values ($D_Y, D_M, D_C$) into said nominal color density values ($D'_Y, D'_M, D'_C$) based on a subsequent fine and/or partial correction of said color original.

10. Apparatus according to claim 9, wherein a storage circuit (14) is disposed between said first and second correction stages for storing said calculated color density values ($D_y, D_M, D_C$).

11. Apparatus according to claim 8, wherein a storage circuit is disposed between the color scanner and the correction device (13,16) for storing said color signal values (R, G, B).

12. Apparatus according to claim 11, wherein the storage circuit is designed as a circuit for electronic scale modification between the color original and the color image during exposure.

13. Apparatus according to claim 8, wherein said correction device (13,16) comprises a memory for storing said calculated nominal color density values ($D'_Y, D'_M, D'_C$) addressable by corresponding color signal values (R, G, B).

14. Apparatus according to claim 8, wherein said correction device (13,16) comprises an anchor grid memory for nominal color density values ($D'_Y, D'_M, D'_C$) addressable by corresponding color signal values (R, G, B) and an interpolation stage for calculating further nominal color density values from said stored nominal color density values.

15. Apparatus according to claim 8, further comprising an amplitude inversion stage for inverting said nominal color density values.

16. Apparatus according to claim 8, further comprising a color density generator (19) connected to the linearization stage (17) to generate desired gradated color density values for exposing color density wedges and/or color fields on said chormatic photosensitive material.

* * * * *